(12) United States Patent
Vitet

(10) Patent No.: US 6,918,868 B2
(45) Date of Patent: Jul. 19, 2005

(54) INFLATABLE RESTRAINT SYSTEM FOR AN AIR BAG

(75) Inventor: Stephane Vitet, Berkley, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/452,276

(22) Filed: Jun. 2, 2003

(65) Prior Publication Data

US 2004/0239085 A1 Dec. 2, 2004

(51) Int. Cl.⁷ ................................................. B31B 1/52
(52) U.S. Cl. ........................ 493/457; 493/449; 493/405; 280/743.1; 280/728.1
(58) Field of Search ................................ 493/457, 449, 493/940, 405, 451; 53/429, 116; 280/743.1, 728.1

(56) References Cited

U.S. PATENT DOCUMENTS

| | | | | |
|---|---|---|---|---|
| 3,624,810 A | | 11/1971 | Hass ........................... | 280/150 |
| 3,680,884 A | * | 8/1972 | Stephenson ................. | 280/731 |
| 3,819,205 A | * | 6/1974 | Dunford et al. ............ | 280/731 |
| 4,148,503 A | * | 4/1979 | Shiratori et al. ............ | 280/731 |
| 4,183,550 A | * | 1/1980 | Sudou ...................... | 280/728.2 |
| 4,793,631 A | * | 12/1988 | Takada ...................... | 280/728.2 |
| 4,902,036 A | * | 2/1990 | Zander et al. .............. | 280/736 |
| 5,140,799 A | | 8/1992 | Satoh .......................... | 53/429 |
| 5,193,846 A | * | 3/1993 | Allard ..................... | 280/728.2 |
| 5,240,282 A | * | 8/1993 | Wehner et al. ............ | 280/728.1 |
| 5,364,126 A | * | 11/1994 | Kuretake et al. ......... | 280/730.1 |
| 5,375,393 A | * | 12/1994 | Baker et al. ................. | 53/429 |
| 5,425,551 A | | 6/1995 | Hawthorn ................ | 280/743.1 |
| 5,613,348 A | * | 3/1997 | Lunt et al. .................... | 53/429 |
| 5,690,358 A | | 11/1997 | Marotzke ................. | 280/743.1 |
| 5,803,483 A | * | 9/1998 | Lunt ....................... | 280/728.1 |
| 5,803,892 A | | 9/1998 | Marotzke .................... | 493/451 |
| 6,241,282 B1 | | 6/2001 | Specht .................... | 280/743.1 |
| 6,260,330 B1 | | 7/2001 | Borowski et al. ............. | 53/429 |

* cited by examiner

Primary Examiner—Sameh H. Tawfik
(74) Attorney, Agent, or Firm—Laura C. Hargitt

(57) ABSTRACT

A supplemental inflatable restraint system includes an air bag for use in a vehicle to restrain an occupant. The air bag is folded and may be placed in a steering wheel cover such that inflation of the air bag causes the air bag to be deployed from the cover by unfolding to define a substantially vertical contact surface for initial contact with the vehicle occupant. The air bag is folded into a modified fan/accordion configuration with terminal folds nested between intermediate folds so that the terminal folds escape before the intermediate folds. During inflation, the air bag unfolds upwardly and downwardly so that the substantially vertical contact surface is substantially parallel to a torso of the occupant.

8 Claims, 5 Drawing Sheets

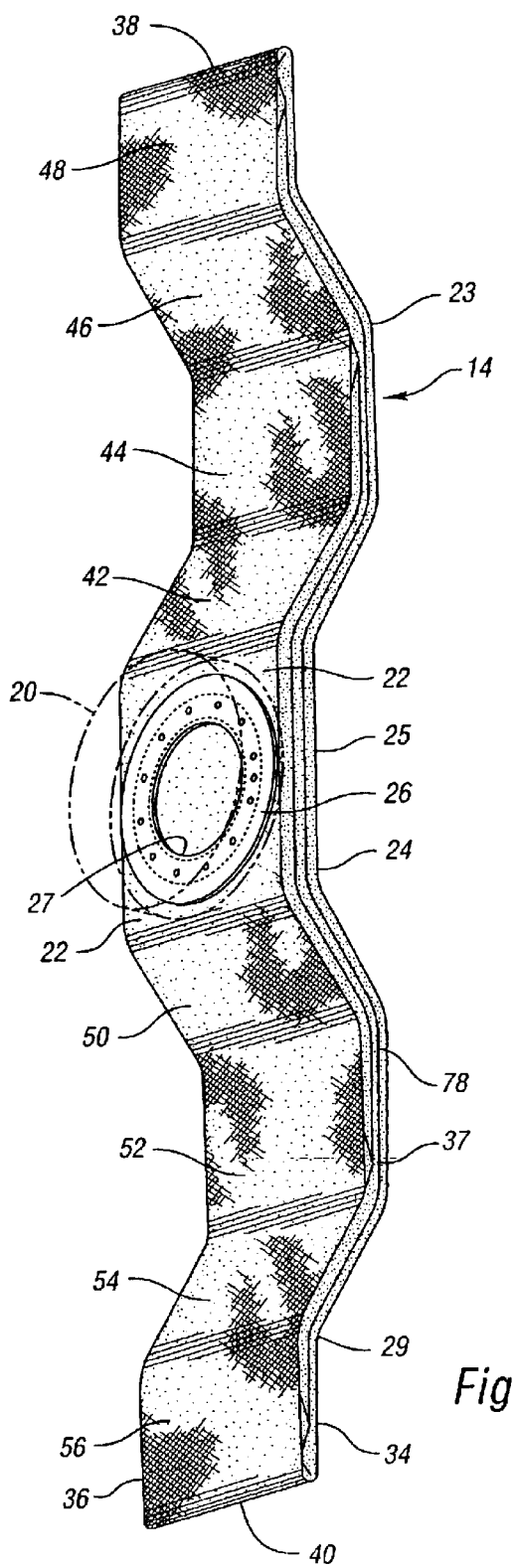
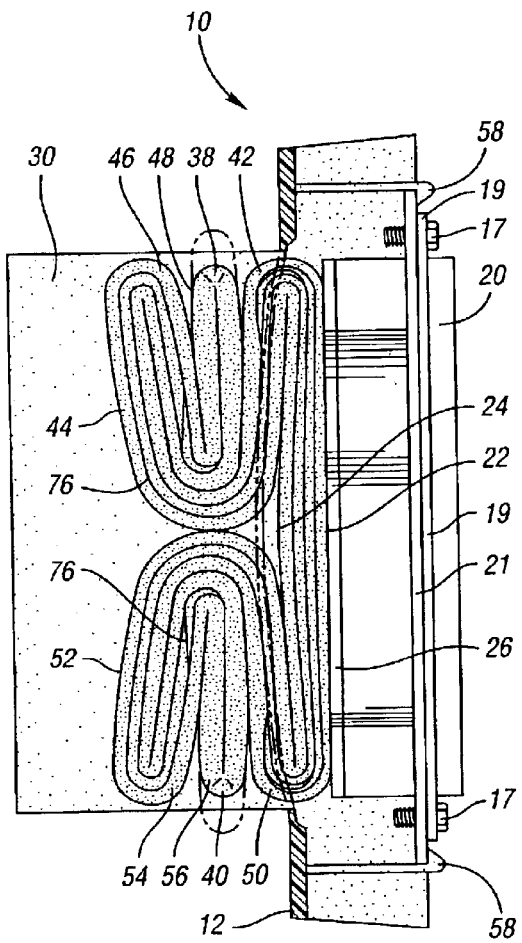
Fig. 4
Fig. 5

INFLATABLE RESTRAINT SYSTEM FOR AN AIR BAG

TECHNICAL FIELD

The present invention relates to a supplemental inflatable restraint system of a vehicle in which the air bag is folded in a manner to obtain controlled deployment of the air bag.

BACKGROUND OF THE INVENTION

An air bag is typically folded and supported in the dashboard or steering wheel of a vehicle. Commonly, the air bag has a number of folds, and when the air bag is inflated, high pressure gas is directed into the air bag to cause the air bag to unfold as it inflates.

In one known supplemental inflatable restraint system described in U.S. Pat. No. 5,425,551 issued Jun. 20, 1995 to the assignee of this application, an air bag is contained within a housing mounted in the dashboard of a vehicle in order to protect the passenger side vehicle occupant. In the event of an accident, the air bag will unroll and deploy to contact the vehicle occupant as the occupant moves forwardly. Thus, the air bag will absorb energy imparted by the occupant and thereby limit forward movement of the occupant within the passenger compartment.

In another passenger side restraint system described in U.S. Pat. No. 5,140,799 issued Aug. 25, 1992 to Satoh the air bag is folded inwardly to straighten both sides of the bag. Then the bag is folded in alternate directions into a zig-zag shape to create folds which are then inserted into its own casing.

SUMMARY OF THE INVENTION

The present invention provides an improved air bag fold configuration wherein the method of folding the air bag is such that the air bag will deploy from a steering wheel cover or other airbag container in a controlled manner.

Initially, and in the sense of this invention, "forward," "rearward," "left," "right," "upwardly" and "downwardly" are to be understood as viewed by a driver or passenger seated in a vehicle and oriented with respect to the vehicle.

In one aspect of the invention, a supplemental inflatable restraint system is provided including an air bag having a rearward contact face for contacting an occupant or driver and a steering wheel cover or air bag container including an inflator operable to inflate the air bag. The air bag is folded and placed in an air bag container or a steering wheel cover in such a manner that actuation of the inflator causes the air bag to move upwardly and downwardly out of the steering wheel cover in a partially unfolded state whereby to present an initially generally vertical surface, including the contact face, to the occupant or driver.

In a further aspect of the invention, the air bag when in an initially vertically flattened configuration defines opposing top and bottom edges extending between opposing lateral edges of the contact face. After being in an initially flattened configuration, the air bag is folded in a modified and improved fan-fold or accordion manner from the top and bottom edges toward a central contact area of the contact face so that the top and bottom edges are adapted to unfold first in directions upwardly and downwardly away from the central contact area during inflation of the air bag.

In a further aspect of the invention, the folded portion of the air bag is folded in a modified fan/accordion manner along a rearward contact face such that inflation of the air bag causes the folded portions to unfold upwardly and downwardly in a vertical plane parallel to the occupant torso's vertical plane.

The invention is also a supplemental inflatable restraint system which comprises an air bag including a forward face and a rearward contact face for contacting a vehicle occupant, and a steering wheel cover including an inflator operable to inflate the air bag and open an openable portion of said steering wheel cover. The air bag may include opposing lateral edges forming side edges of said contact face and opposing top and bottom edges extending between said opposing lateral edges of said contact face. The air bag includes a first and second series of final folds that are configured as modified and improved fan/accordion folds. Each series of final folds includes a terminal fold and a plurality of intermediate folds foldable onto a portion of said contact face to fit within the steering wheel cover with said terminal folds sufficiently outwardly escapably positioned between intermediate folds so that the terminal folds escape from the steering wheel cover before the intermediate folds; and wherein the operation of said inflator causes said air bag to open said openable portion of said steering wheel cover to permit the terminal folds of the air bag to escape said steering wheel cover upwardly and downwardly from said portion of said contact face during subsequent inflation of the air bag so as to initially present the first and second series of final folds as a generally vertical surface substantially parallel to the torso of said occupant.

The invention also provides a method of folding an air bag for use in a supplemental inflatable restraint system comprising:

providing an air bag having a rearward contact face for contacting a vehicle occupant, an opposite forward face, and opposing top and bottom edges;

providing a steering wheel cover for receiving said air bag, and including an inflator for inflating the air bag;

folding and placing the air bag in the cover such that actuation of said inflator for inflating said air bag causes the air bag to be deployed through the steering wheel cover upwardly and downwardly in a substantially folded condition such that said contact face defines a substantially vertical surface substantially parallel to the torso of the vehicle occupant for initial contact with the vehicle occupant; and wherein the folding of the air bag comprises folding the opposing top and bottom edges of the air bag along the rearward face in a modified and improved fan/accordion manner towards each other to form opposing folded positions on the rearward face of the air bag.

This method also comprises folding the air bag by placing the folded portions rearwardly of the contact face sufficiently to fit within the steering wheel cover.

The invention is also a method of folding air bag material for use in a supplemental inflatable restraint system for a vehicle occupant, comprising:

configuring material into an elongated inflatable bag having an inflator opening on one side of the bag and a pair of inflatable bag portions, each bag portion extendable in opposing directions from the inflator opening to a respective terminal portion or portions, folding each inflatable bag portion into intermediate folds on the other side of the elongated inflatable bag between the inflator opening and each terminal portion or portions, and positioning the terminal portion or portions between intermediate folds on said other side of the elongated bag so that the terminal portion or portions upon inflation of each inflatable bag portion is outwardly escapable before the intermediate folds of the inflatable bag portion so as to initially present each bag portion as a generally vertical surface substantially parallel to the torso of the occupant.

Other objects and advantages of the invention will be apparent from the following description, the accompanying drawings, and the appended claims.

BRIEF DESCRIPTION OF THE DRAWINGS

FIG. 4 is a perspective view of the initially folded air bag with side pleats to illustrate the starting formation of the final folds prior to insertion of the air bag into the steering wheel cover;

FIG. 5 illustrates the finally folded air bag as it initially starts to inflate through the forced open doors or flaps of the steering wheel cover from the air bag's position within the steering wheel cover;

DESCRIPTION OF THE PREFERRED EMBODIMENT

Inflatable Restraint System

Figure 6:
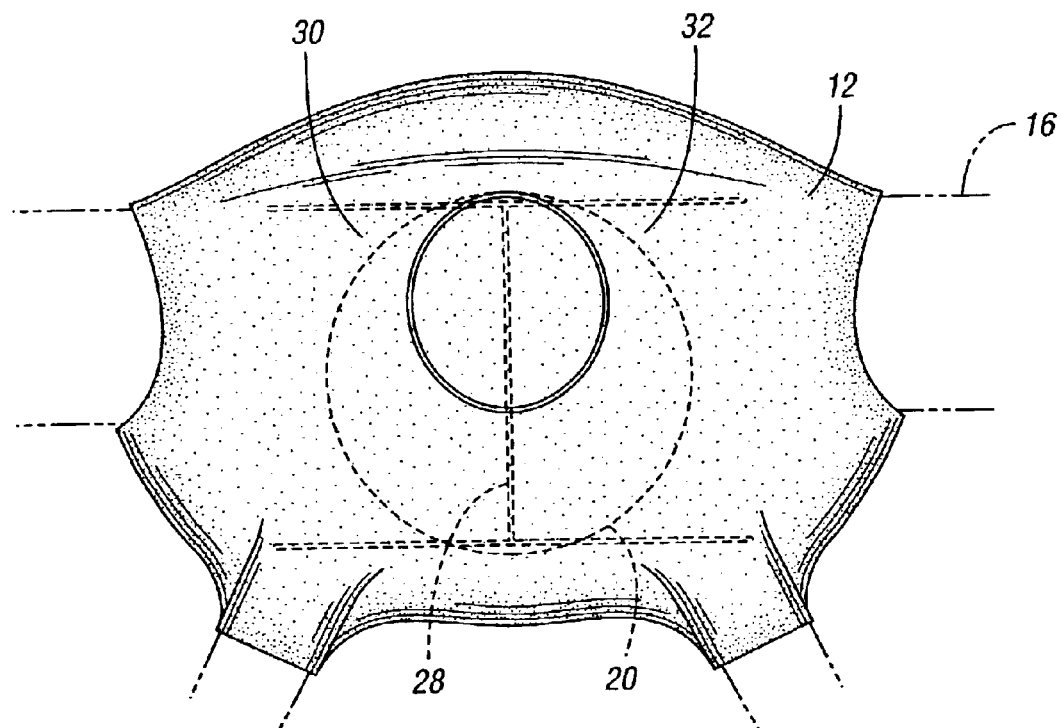
FIG. 6 is a rearwardly facing fragmentary elevational view of a steering wheel and steering wheel cover for housing an air bag folded in accordance with the present invention and having an I-tear seam which tears open for releasing an inflating air bag.
Figure 7:
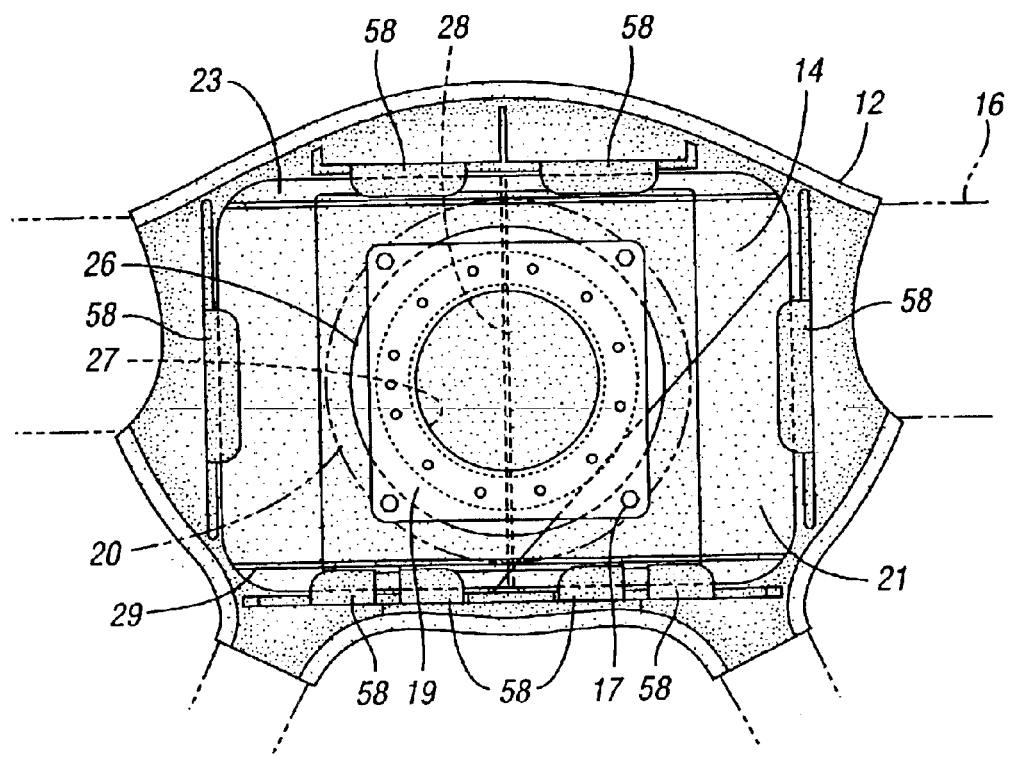
FIG. 7 is a fragmentary forwardly facing or backside elevational view of the steering wheel cover of FIG. 6 illustrating a clamped-in back plate partially broken away, to show partially in phantom, an inflator bolted to the back plate and an air bag folded in accordance with the present invention and oriented to release or escape the steering wheel cover upwardly and downwardly.

The supplemental inflatable restraint system of the present invention is mounted in a steering wheel cover or air bag container or air bag module for restraining an occupant located in a driver's seat during a collision. The restraint system may also be used to protect occupants in other seats. The supplemental inflatable restraint system 10 is illustrated in FIGS. 6 and 7. The system includes a housing 12 and an air bag 14 which is mounted in the housing 12. The housing 12 is a steering wheel cover on a spoked steering wheel 16. The steering wheel has a rim 18 (FIG. 9a) spaced from the steering wheel cover 12. The air bag includes an inflator 20 which is located inside the housing 12 in fluid communication with the interior of the air bag 14. The inflator 20 provides pressurized gas, such as nitrogen, for inflating and deploying the air bag 14 from the vehicle steering wheel. The air bag 14 and inflator 20 are retained in the steering wheel cover by a back plate 21. The inflator 20 has a flange 19. Bolts 17 attach the inflator flange 19 to the back plate 21, whereby to hold the inflator in place.

In particular and with reference to FIG. 4, air bag 14 of the supplemental inflatable restraint system 10 includes a forward face 22 facing away from an occupant and a rearward contact face 24 facing the occupant for contacting the occupant when the air bag inflates. The forward face has a collar 26 defining an airbag opening 27 which interconnects the interior of the air bag with the inflator 20. An upper inflatable bag portion 23 and a lower inflatable bag portion 29 extend in opposite directions from the air bag opening 27. As shown in FIG. 6, the steering wheel cover 12 is openable along an I-shaped tear seam 28. The tear seam splits open into a sideways-opening left flap 30 and right flap 32. The inflator 20 operates to inflate the air bag. Tear seam shapes other than I-shaped may also be used.

Referring to FIG. 4, the air bag 14 is initially folded with a left lateral edge 34 and an opposing right lateral edge 36 located along respective sides of the contact face 24. Both lateral edges are pleated as at 37 and are generally straight and parallel to each other. The way the pleats are initially formed will be described hereinafter.

The folded air bag, as seen in FIG. 4 with the pleats and starting final folds, includes a top edge 38 on the upper bag portion 23 and an opposing bottom edge 40 on the lower bag portion 29, both edges extending between the opposing lateral edges 34, 36 of the contact face 24.

Figure 2:
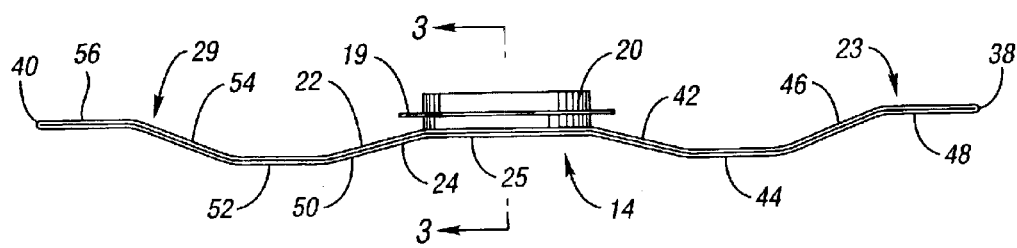
FIG. 2 is a left side elevational view of the air bag in FIG. 1 showing an inflator and an air bag with final folds and having a forward surface and a rearward contact surface with initially folded pleats therebetween.

The air bag 14 is finally folded to include a series of final folds 42, 44, 46, 48, 50, 52, 54 and 56. The final folds are modified fan/accordion or zig-zag folds which are folded onto a flat vertical central portion 25 of the contact face 24. Upwardly unfolding final folds 42, 44, 46 and 48 and downwardly unfolding final folds 50, 52, 54 and 56 are best seen in FIGS. 2, 4 and 5. Final folds 46, 48, 54 and 56 are terminal folds. Folds 42, 44, 50 and 52 are intermediate folds. The folds are layered on or laminated onto each other from the opposing top and bottom edges 38, 40 of said air bag until they repose on the generally flat central contact portion 25 of rearward contact face 24. The final folding sequence positions the terminal folds to be sufficiently outwardly escapably between intermediate folds so that the terminal folds escape before the intermediate folds as suggested by the phantom lines in FIG. 5. The sequence of folding follows: First, intermediate folds 42 and 50 are folded onto the flat central portion 25 of the air bag's rearward contact surface 24. Then the terminal folds 46, 48 are folded together as a pair onto the forward face 22 of the air bag's intermediate fold 44 and again folded onto the forward face 22 of the air bag's intermediate fold 42 which has been folded onto the flat central portion 25 of the air bag. Secondly, intermediate folds 50 and 52 are folded onto the flat central portion 25 of the air bag's rearward contact surface 24. Then the terminal folds 54, 56 are folded together as a pair onto the forward face 22 of the air bag's intermediate fold 52 and again folded onto the forward face 22 of the air bag's intermediate fold 50 which has been folded onto the flat central portion 25 of the airbag. The first and second folding sequence may be done simultaneously or separately. In each sequence, the terminal folds end up between intermediate folds with the terminal folds poised, upon air bag inflation, to escape upwardly and downwardly, from the air bag container before the intermediate folds so as to present the upwardly and downwardly unfolding terminal and intermediate folds as a generally vertical surface substantially parallel to the torso of an occupant seated in the vehicle behind the air bag.

The terminal folds 46, 48 and/or 54, 56 may continue to be folded sufficiently in a zig-zag manner as additional terminal folds of the folded air bag between intermediate folds 42 and 44 and/or between intermediate folds 50 and 52. In this way the additional terminal folds may also escape before the intermediate folds.

Figure 1:
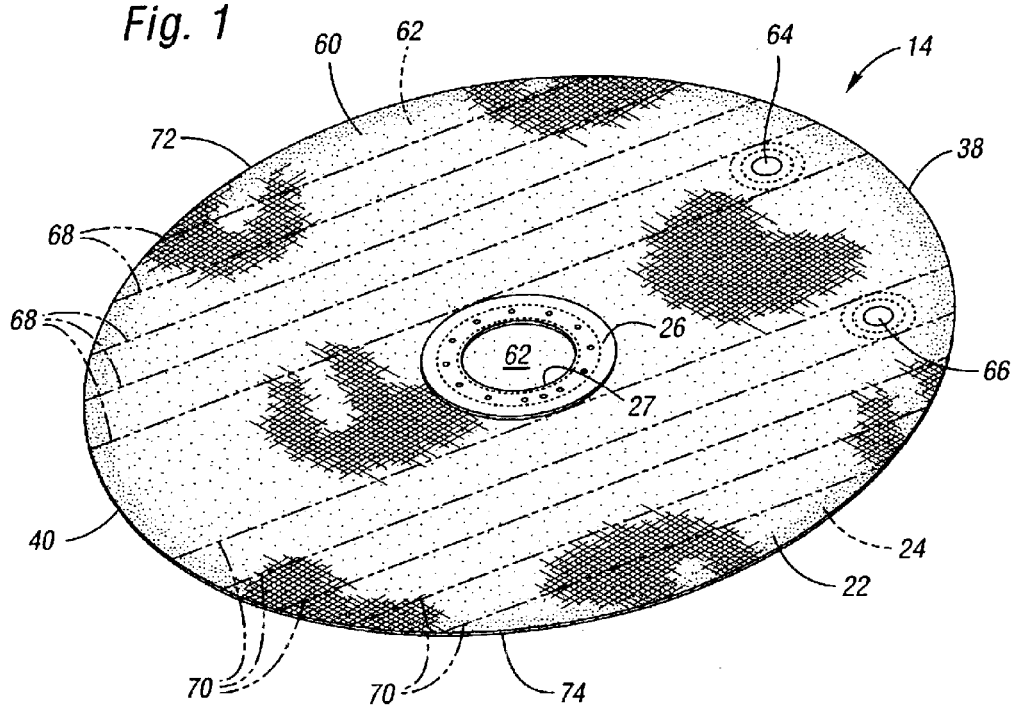
FIG. 1 is a perspective view of an air bag placed in a flat condition with the forward surface up and in preparation for folding in accordance with the present invention.

With reference to FIG. 1, the air bag 14, before any folding, is comprised of two generally circular sheets of material, a forward sheet 60 and a rearward occupant-facing sheet 62. The forward sheet has the collar 26 thereon for connecting the inflator 20 to the air bag and a pair of vents 64, 66 for deflating the air bag. The sides of the material need not be circular. They could be curvilinear. They could also be any shape tuckable into the lateral edges of the final folds which could then be folded to fit within the footprint of the steering wheel cover or other container.

Fold lines 68 and 70, respectively, facilitate tuckable portions 72 on the right side of the air bag and tuckable portions 74 on the left side of the air bag. The tuckable portions initially become the right side pleats 76 and the left side pleats 78, see FIG. 3.

With particular reference to FIGS. 1 and 4, opposing lateral edges 34, 36 may be initially semi-circular pieces of air bag material. In this arrangement the air bag may be provided with initial chord-like fold lines 68, 70 along the foldable opposing lateral edges to form the initially folded air bag with its upper and lower inflatable bag portions 23, 29. The final folds 42–56 are substantially perpendicular to the initial folds or pleats 76, 78.

The air bag is folded to fit within the steering wheel cover with the terminal folds positioned between intermediate folds so that the terminal folds escape outwardly, upwardly and downwardly from the steering wheel cover before the intermediate folds. In point of time, however, the escape is substantially simultaneous.

As seen in FIG. 7, the folded air bag 14 with inflator 20 is placed in the steering wheel cover 12 and retained therein by the back plate 21. The back plate 21 is retained by integral tabs 58 on the steering wheel cover. In turn the inflator flange 19 is attached to the back plate by four bolts 17 or other fasteners. As applied to an in-position occupant, actuation of the inflator 20 causes the air bag to open the steering wheel cover flaps 30, 32 and escape from said steering wheel cover as seen in its incipiency in FIG. 5. The folded portions 42–48 of upper inflatable bag portion 23 and folded portions 56–60 of the lower inflatable bag portion 29 substantially simultaneously unfold upwardly and downwardly exposing the rearward contact face of the airbag to the occupant such that a generally vertical flat contact face is substantially immediately presented to the occupant during air bag inflation.

Figure 8A:
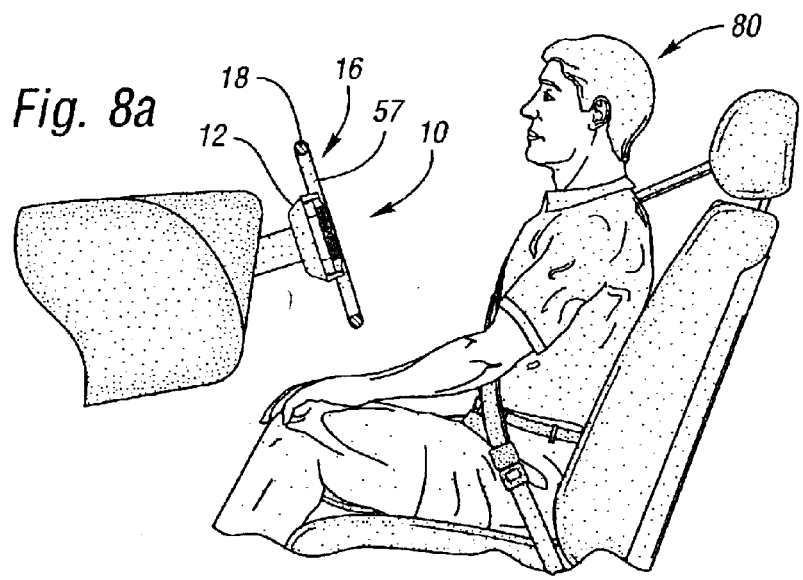
FIGS. 8a, 8b and 8c illustrate the operational sequence of the finally folded air bag of this invention for protecting an in-position driver.
Figure 8B:
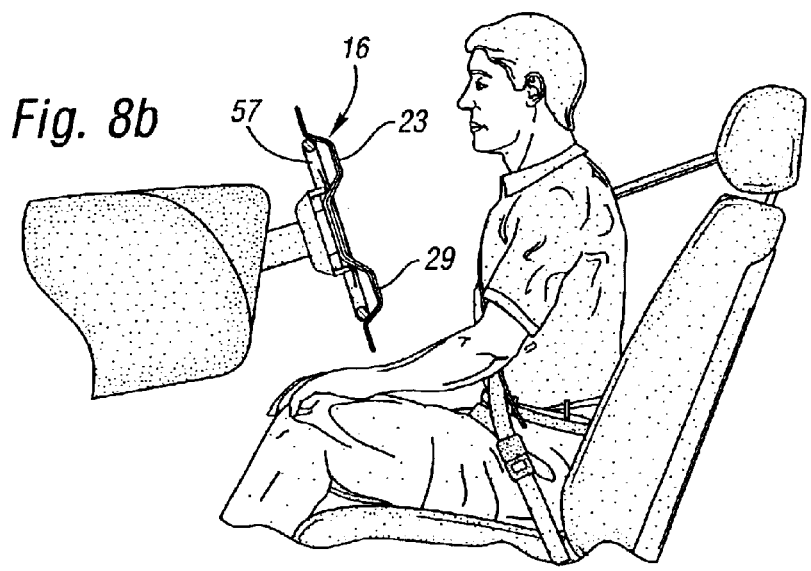
Figure 8C:
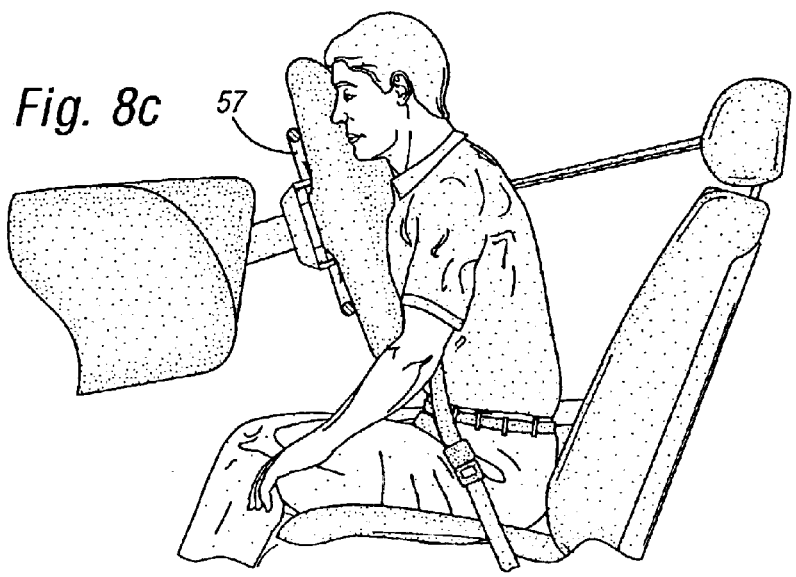

Thus, where the occupant is in a seated position, the inflated terminal folds may engage the occupant's head while the central and lower portions of the rearward contact face 24 may engage the occupant's chest, see FIG. 8c.

The fold configurations of the present invention configure the air bag 14 to deploy through the tear-open doors of the steering wheel cover or air bag container 12 in a substantially initially and finally folded condition and to subsequently unfold upwardly and downwardly during inflation of the air bag 14 as the terminal folds escape upwardly and downwardly. As may be seen in each of these FIGS. 8a–c, the unfolded substantially flat contact surface 24 is initially presented for conforming contact with the occupant 80.

In addition, the air bag of this invention provides a restraint system which is adapted to effectively restrain all seated occupants rearwardly, or normally seated occupants (in-position). FIGS. 8a, 8b and 8c illustrate a rearwardly seated (in-position) occupant 80 during deployment of the air bag 14.

Figure 9A:
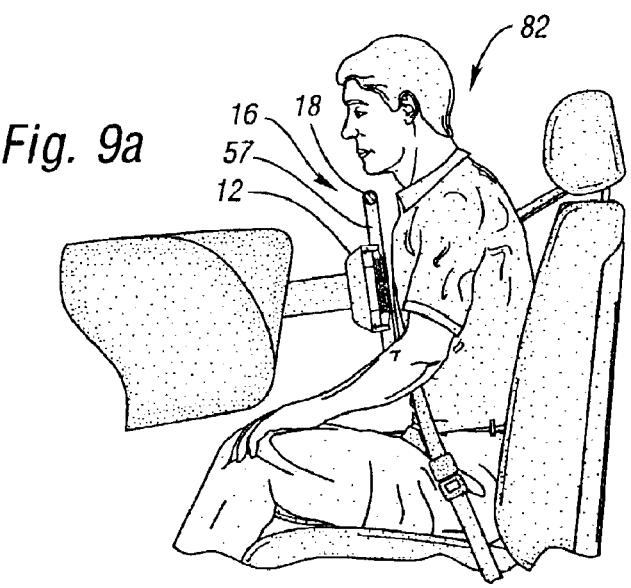
FIGS. 9a, 9b and 9c illustrate the operational sequence of the finally folded air bag of this invention when an occupant's torso is adjacent the steering wheel cover upon deployment.
Figure 9B:
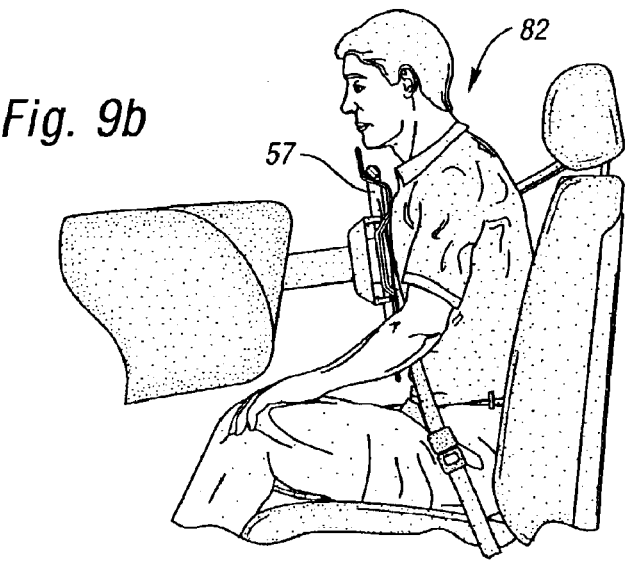
Figure 9C:
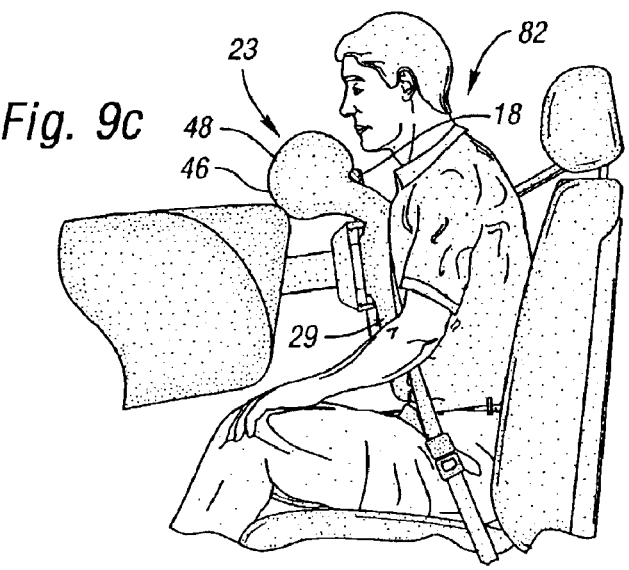

FIGS. 9a–c illustrate an occupant's torso adjacent the steering wheel cover 12. The partially folded air bag is starting to inflate, the terminal fold, such as 48, escapes upwardly and extends through the space 57 between the rim 18 and cover 12 to minimize the amount of interaction between the air bag and the head of the occupant, see FIG. 9c.

FIGS. 9a, 9b and 9c illustrate a forwardly seated occupant 32 during deployment of the air bag 14. An example would be a driver who falls asleep and/or leans on the steering wheel.

Method of Folding and Installing the Air Bag

The method of folding the air bag for use in a supplemental inflatable restraint system will now be described.

Figure 3:
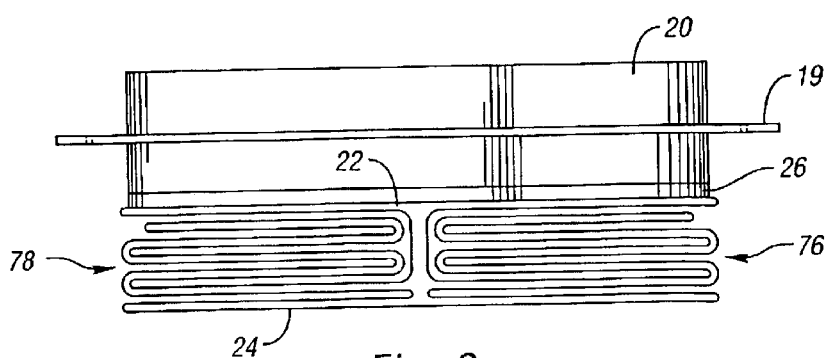
FIG. 3 is a sectional view looking downwardly from the top of the air bag, partly in elevation, and taken along 3—3 in FIG. 2 to show initial folds which have been tucked in between the forward and rearward surfaces of the air bag to form the initially folded pleats shown schematically as a single line in FIG. 2.

Initially, the air bag material of FIG. 1 is configured into the elongated inflatable air bag 14 of FIGS. 2 and 3 having a pair of inflatable bag portions 23, 29 having straight left and right lateral edges 34, 36. Each bag portion 23, 29 extends in an opposite direction. The air bag 14 is provided with a rearward contact face 24 for contacting a vehicle occupant, an opposite forward face 22, and opposing top and bottom edges 38, 40. Each of the inflatable bag portions 23, 29 is finally folded onto the rearward contact face 24 with terminal folds and intermediate folds in a modified fan/accordion manner.

A steering wheel cover or air bag container or module 12 is provided for receiving the air bag. The module 12 includes an inflator 20 for inflating the air bag 14.

The air bag 14 is initially and finally folded (FIGS. 3 and 5) and then retained in the steering wheel cover or module 12 by overlaying tabs 50 on the cover which hold the back plate and thus the air bag in place. The inflator is bolted to the back plate. Actuation of the inflator for inflating the air bag causes the air bag to be deployed away from the tab-retained back plate and through the steering wheel cover upwardly and downwardly to define a substantially flat vertical contact surface for initially contacting the vehicle occupant.

The modified way the air bag is finally folded comprises folding the terminal folds onto an intermediate fold and then onto another intermediate fold in a modified fan/accordion manner. This positions terminal folds between the intermediate folds. Such modified folding positions terminal folds so that they are sufficiently outwardly, escapably between intermediate folds so that the terminal folds escape before the intermediate folds. Thus, each inflatable bag portion is presented as a generally vertical surface substantially parallel to the occupant's torso.

The method may also include initially folding the air bag to provide the straight lateral edges 34, 36. The curvilinear material configuration is tucked inwardly to form the straight lateral edges 34, 36 by folding along chordal lines 68, 70 as seen in FIG. 1. Such initial tucking and folding forms pleats 76, 78 between the forward face 22 and the rearward contact face 24, as seen in FIG. 3.

The method also includes finally folding the air bag so that the folded portions are rearwardly of said rearward contact face by folding the folded portions sufficiently compactly to fit within a steering wheel cover, air bag container or module.

Thus, the method of folding air bag material for use in a supplemental inflatable restraint system for a vehicle occupant, comprises:

configuring material (FIG. 1) into an elongated inflatable bag having an inflator opening 27 on one side 22 of the bag and a pair of inflatable bag portions 23, 29. Each bag portion extends in an opposite direction from the inflator opening 27 to a respective terminal portion 46, 48 and 54, 56.

Each inflatable bag portion is then folded into intermediate folds 42, 44 and 50, 52 on the other side 24 of the elongated inflatable bag between the opening and one or more terminal portions.

One or more terminal portions is/are positioned between intermediate folds on said other side 24 of the elongated bag so that each terminal portion upon inflation of each inflatable bag portion is outwardly escapable before the intermediate folds of the inflatable bag portions 23, 29 so as to initially present each bag portion 23, 29 as a generally vertical surface, substantially parallel to the torso of the occupant.

While the form of apparatus and method herein described constitutes a preferred embodiment of the invention, it should be understood that this invention is not limited to this precise form of apparatus or method, and that changes may be made therein without departing from the scope of the invention, which is defined in the appended claims.

What is claimed is:

1. A supplemental inflatable restraint system comprising:
    an air beg including a forward face and a rearward contact face for contacting a vehicle occupant;
    a steering wheel cover including an inflator operable to inflate said air bag and open an openable portion of said steering wheel cover;
    said air bag including opposing lateral edges forming side edges of said contact face;
    said air bag including opposing top and bottom edges extending between said opposing lateral edges of said contact face;
    said air bag including first and second series of final folds being configured as a modified fan/accordion fold, each series of final folds including outer terminal folds and a plurality of intermediate folds foldable onto a portion of said contact face to fit within the steering wheel cover with said outer terminal folds outer sufficient outwardly escapably positioned between intermediate folds as modified so that the outer terminal folds escape from the steering wheel cover before the intermediate folds; and
    wherein the operation of said inflator causes said air bag to open said openable portion of said steering wheel cover to outer terminal folds of the air bag to escape said steering wheel cover upwardly and downwardly from said portion of said contact face during subsequent inflation of the air bag so as to initially present the first and second series of final folds as a generally vertical surface substantially parallel to the torso of said occupant.

2. The supplemental restraint system of claim 1, further including a steering wheel supporting said steering wheel cover, said steering wheel having a rim spaced from said steering wheel cover, and the outer terminal folds escaping upwardly and extending sufficiently through the space between the rim and the steering wheel cover when the occupant torso is adjacent the steering wheel cover upon deployment.

3. The system as in claim 1, wherein said opposing lateral edges comprise inflatable pleats.

4. The system ma in claim 1, wherein said opposing lateral edges are semi-circular and said air bag is provided with initial chord-like folds along the opposing lateral edges and said final folds being substantially perpendicular to said initial folds.

5. An inflatable air bag for use in a supplemental inflatable restraint system, said air bag comprising:
    a forward face;
    a rearward contact face for contacting a vehicle occupant;
    opposing lateral edges located along side edges of said contact face;
    opposing top and bottom edges extending between said opposing lateral edges of said contact face; and
    said air bag being folded into folded portions in a modified fan/accordion manner from said top and bottom edges to include outer terminal folds and intermediate folds on a generally flat contact portion of said contact face, said outer terminal folds of said folded air bag being sufficient outwardly escapably positioned as modified between intermediate folds so that the outer terminal folds escape before the intermediate folds, and said intermediate folds and said outer terminal folds of said air bag substantially simultaneously unfolding upwardly and downwardly along said rearward face and away from said contact portion during inflation of said air bag so as to initially present the upwardly and downwardly unfolding outer terminal and intermediate folds as a generally vertical surface substantially parallel to the torso of said occupant.

6. The inflatable air bag as in claim 5, including a series of initial chord-like folds extending between said lateral edges from said contact area wherein said initial chord-like folds are formed prior to formation of said folded portions.

7. The inflatable air bag as in claim 6, wherein said initial folds are formed as pleated folds.

8. The inflatable air bag as an claim 6, including a plurality of pleats formed between said forward face and said rearward contact face and substantially parallel to said lateral edges, wherein said initial folds are tucked to form said pleats prior to formation of said folded portions.

* * * * *